Figure 1:
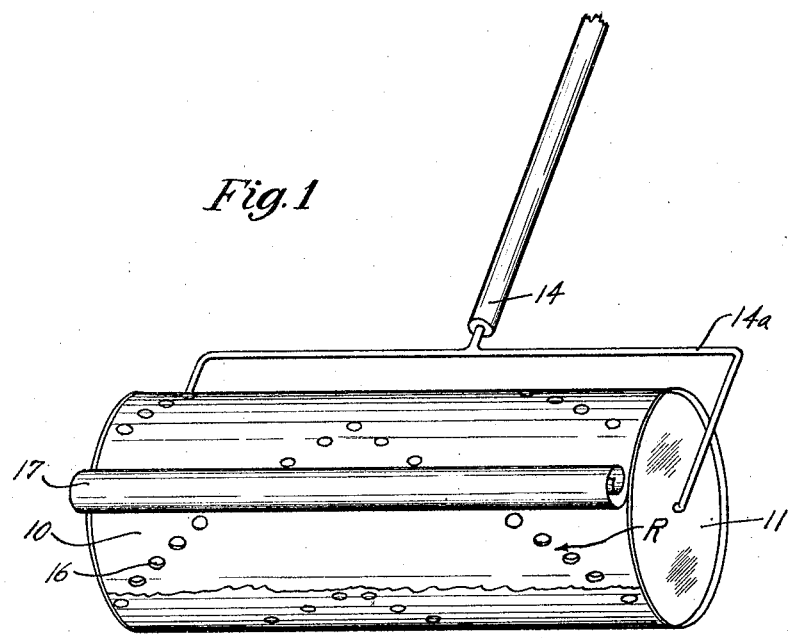

March 15, 1932.　　H. R. TORRENCE　　1,849,159

FERTILIZER CARTON AND DISPENSER

Filed Dec. 18, 1929

Inventor
Homer R. Torrence.

Attorney.

Patented Mar. 15, 1932

1,849,159

UNITED STATES PATENT OFFICE

HOMER R. TORRENCE, OF ONTARIO, CALIFORNIA

FERTILIZER CARTON AND DISPENSER

Application filed December 18, 1929. Serial No. 414,970.

This invention relates in general to containers and dispensers for pulverulent materials, and has to do particularly with a container for pulverulent fertilizers, which serves not only the purpose of a package for shipping and handling such materials on the market but also as a dispenser for fertilizers, whereby the latter may be applied to the soil in proper quantities and distribution. By way of pointing out the general objects and advantages of the present form of container, mention may be made preliminarily of certain points concerning the handling and dispensing of pulverulent fertilizers. In order to apply the fertilizer to the soil in the proper manner and without waste, mechanical distributing means is required, since distribution by hand, being both inconvenient and laborious, is virtually impossible without resulting in overtreating of the soil in certain places and undernourishing it in others. According to the usual mechanical method of applying fertilizer to the soil, the fertilizer is removed from the package or sack in which it may be shipped and placed in a suitable machine for distributing it over the ground. Dispensing of the fertilizer in this manner thus involves, in addition to the cost of the machine, further expenditure in time and labor in the handling and transferring of the fertilizer from packages to the machine.

In accordance with the invention I have provided a form of container for the fertilizer which is adapted for use also as a dispenser, thereby relieving the necessity for using a distributing machine. The container may be described generally as comprising a cylindrical shell having a plurality of indicated perforable areas adapted to be opened by the consumer, the shell having end closures provided with means for attachment to a handle whereby the container may be rolled along the ground so as to cause the fertilizer to be discharged through the perforations. By distributing the fertilizer from the carton in this manner, the necessity for the use of inert fillers, commonly mixed with active fertilizing ingredients to enable them to be applied by hand broadcasting, is avoided since distribution through the perforations of the container is of such evenness as to preclude the possibility of overfeeding the soil in localized spots. Another advantage of the present type of container resides in the fact that it is particularly suitable as a package for placing the fertilizer on the market, whereby it may be delivered in sealed condition with its weight and analysis indicated on the carton.

Figure 2:
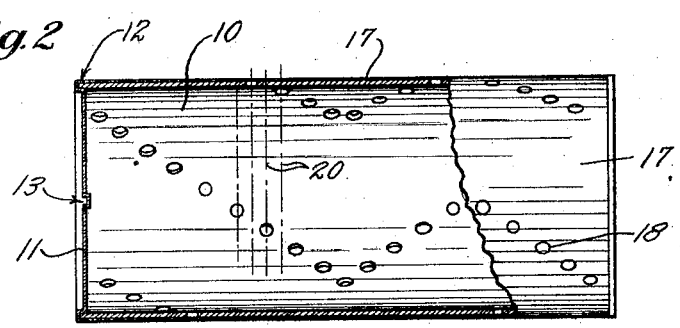

The above and further objects and aspects of the invention will be discussed to best advantage in the following detailed description of a typical and preferred embodiment thereof, reference being had throughout the description to the accompanying drawings in which:

Fig. 1 is a perspective view showing the container to which is attached a handle for rolling it along the ground, a portion of the wrapper being rolled back to show the perforated shell; and Fig. 2 is a part sectional and elevational view of the container showing particularly the spacing and arrangement of the perforations.

Referring to the drawings, numeral 10 indicates a cylindrical shell which may be formed of any suitable material, preferably, however, of paper tubing, the ends of the shell being closed by metal caps 11. These caps preferably, though not necessarily, being made in a single piece, that is without a removable lid, and are shown to be crimped as at 12 to the ends of the shell, thereby rendering the carton non-refillable. The caps 11 are provided with means for attachment to handle, and are shown preferably as having scored center points 13 which may be readily punched through by the consumer. Any suitable means may be employed for rolling the container along the ground, there being shown as typical, a handle 14 having a forked portion 14a, the ends of which are adapted to be inserted within the center openings in the caps after the scored areas 13 are punched through.

As previously mentioned, the shell has a plurality of indicated perforable areas, these being formed in the illustrated embodiment of the invention, by rows R of perforations 16 formed in the shell 10, the perforations being covered by means of a wrapper 17 pasted around the outside of the shell and having printed circles or markings 18 registering with the perforations. Thus the consumer may perforate the normally closed or imperforate container by punching through the wrapper at the indicated points.

In order to effect proper distribution of the fertilizer, the perforations preferably are formed, as indicated in the drawings in four diagonally extending rows, equally spaced circumferentially about the cylinder. As will be noted with reference to lines 20 in Figure 2, the perforations in adjacent rows are relatively staggered in order to provide for an even and uniform distribution of the fertilizer throughout the length of the container, and to prevent an excessive delivery of fertilizer such as might occur were the corresponding perforations in each row circumferentially alined. It will be understood that as the container rolls along the ground, the fertilizer will be released only from the perforations in the lower half section of the container, the arrangement of the perforations being such that as the openings in the rear side discontinue discharging as they move upward past the horizontal center of the container, the openings in the forward or advancing side of the container start to discharge as they move downward past the center. And since for any given circle on the container, for example through one of lines 20, there are but two perforations at diametrically opposite sides, discharge can occur through only one of these perforations at a time, thereby preventing double application of fertilizer in one spot. It may be mentioned that the size, number and arrangement of the openings may be made in direct relation to the potency of the fertilizer. Also if it is desired to release a maximum supply from the container, all the perforations may be opened, whereas if it is necessary to release but a fraction of the maximum amount, and at comparatively more widely spaced points, the number of holes punched through may be varied accordingly.

It will be understood that although for purposes of description, I have shown one means whereby the container may be rendered perforable, that is by perforating the shell and covering it with a wrapper which may be punched through, in the broader aspects of the invention any suitable means may be employed for providing perforable areas in the shell. By way of example, certain other methods may be mentioned which will be readily understood without the necessity of illustrations in the drawings. For instance, a transparent wrapper through which the perforations in the shell would be clearly visible, might be employed, or the outside wrapper could be replaced by a liner within the shell. Also, it might be found desirable to provide an outside wrapper which could be entirely removed to expose the perforations in the shell. In case a metallic instead of a paper shell were used, the areas to be perforated could be scored to enable them to be easily punched through. And numerous additional methods will readily suggest themselves to those familiar with the art.

I claim:

1. A combined package and dispenser for pulverulent fertilizers or the like, comprising a cylindrical paper shell having indicated perforable areas, and metallic end closures for said shell, provided with means for attachment to a handle, whereby the dispenser may be rolled along the ground.

2. A combined package and dispenser for pulverulent fertilizers or the like, comprising a cylindrical paper container having indicated perforable areas in its side walls, and having non-removable metallic end closures having scored center points through which a handle may be inserted for rolling the container along the ground.

3. A combined package and dispenser for pulverulent fertilizers or the like, comprising a cylindrical paper container adapted to be filled with fertilizer and having its ends sealed by non-removable caps, said shell having indicated perforable areas adapted to be punched through to release the fertilizer as said container is rolled along the ground.

4. A combined package and dispenser for pulverulent fertilizers, comprising a cylindrical paper shell having a perforated layer and an imperforate layer, the latter having markings indicating the perforations in said perforated layer, and end closures for said shell provided with scored center points through which a handle may be inserted for rolling the dispenser along the ground.

5. A combined package and dispenser for pulverulent fertilizer, comprising a cylindrical paper shell having indicated perforable areas in longitudinally extending and circumferentially spaced rows, said perforable areas being relatively staggered in successive rows, and metallic end closures for said shell having means for attachment to a handle.

In witness that I claim the foregoing I have hereunto subscribed my name this 2nd day of December 1929.

HOMER R. TORRENCE.